(12) United States Patent
Ogino

(10) Patent No.: US 6,685,046 B2
(45) Date of Patent: Feb. 3, 2004

(54) FOOD PRESERVATIVE CONTAINER

(76) Inventor: Takashi Ogino, c/o Celec Kabushikikaisha 341 Oyabu-cho, Tajimi-shi, Gifu-ken (JP)

( * ) Notice: Subject to any disclaimer, the term of this patent is extended or adjusted under 35 U.S.C. 154(b) by 26 days.

(21) Appl. No.: 09/994,911

(22) Filed: Nov. 27, 2001

(65) Prior Publication Data

US 2002/0066732 A1 Jun. 6, 2002

(30) Foreign Application Priority Data

Dec. 1, 2000 (JP) ......................................... 2000-367316

(51) Int. Cl.[7] ............................................. B65D 51/16
(52) U.S. Cl. ................................ 220/367.1; 220/212.5; 220/912
(58) Field of Search ........................... 220/212.5, 912, 220/367.1, 203.04, 203.11, 203.16, 281, 361, 366.1, 669, 657, 360, 786, 787; 215/341, 343, 344, 364

(56) References Cited

U.S. PATENT DOCUMENTS

| | | | | |
|---|---|---|---|---|
| 1,928,298 A | * | 9/1933 | Matter et al. ............. | 220/367.1 |
| 2,467,061 A | * | 4/1949 | Mason ........................ | 220/327 |
| 2,913,140 A | * | 11/1959 | Vuillemenot ................ | 220/210 |
| 3,411,659 A | * | 11/1968 | Seifert ......................... | 220/287 |
| 3,529,744 A | * | 9/1970 | Johnson et al. ........... | 220/212.5 |
| 3,813,904 A | * | 6/1974 | Wallskog ..................... | 70/169 |
| 4,218,599 A | * | 8/1980 | Garn ........................... | 200/530 |
| 4,303,171 A | * | 12/1981 | Schremmer ................. | 220/238 |
| 4,360,119 A | * | 11/1982 | Olivo .......................... | 220/522 |
| 4,413,748 A | * | 11/1983 | Kessler et al. .............. | 220/281 |
| 4,494,674 A | * | 1/1985 | Roof ........................... | 220/784 |
| 4,991,732 A | * | 2/1991 | La Barge et al. ........... | 215/260 |
| 5,181,626 A | * | 1/1993 | Daenen et al. .............. | 220/282 |
| 5,584,414 A | * | 12/1996 | Neubeck ..................... | 220/753 |
| 5,927,183 A | * | 7/1999 | Lee ............................. | 220/912 |
| 6,307,193 B1 | * | 10/2001 | Toole ........................ | 219/735 |
| 6,364,152 B1 | * | 4/2002 | Poslinski et al. ........... | 220/788 |

FOREIGN PATENT DOCUMENTS

JP 4-118349 10/1992

* cited by examiner

*Primary Examiner*—Robert Hylton
(74) *Attorney, Agent, or Firm*—William A. Drucker

(57) ABSTRACT

A ventilated food preservation, container having a replaceable hermetically re-sealable lid closure cover portion fitted with a lid finger grip to open the lid and allow control of pressure inside the container in a single movement through a ventilation pressure release hole. When the outer cover portion of the finger grip portion is gripped to lift the closure member, the finger grip portion partially detaches from the lid and releases the seal between the lid and the container.

6 Claims, 15 Drawing Sheets

FOOD PRESERVATIVE CONTAINER

BACKGROUND OF THE INVENTION

1. Field of the Invention

The present invention relates to a food preservative container comprising a container body and a closure member fitted over the container body so as to close an opening of the container body, the closure member having a peripheral edge that can be hermetically fitted to the container body.

2. Description of the Related Art

A conventional food preservative container comprises a container body and a closure member attached with a finger grip portion and fitted over the container body so as to close an opening of the container body, the closure member having a peripheral edge that can be hermetically fitted to the container body (see Japanese Unexamined Utility Model Publication No. 1992-118349 for example). Such a conventional container has an advantage in that food put in the container can be kept in a very favorable condition from the viewpoint of food hygiene because communication with air between the outside and inside of the container is cut off.

The conventional food preservative container, however, involves a problem in that when the container stored in a refrigerator is taken out of the refrigerator and is to be opened on a dining table, the closure member cannot be detached from the container body even if the user tries to lift up the closure member while gripping the finger grip because the pressure of air within the container is reduced.

In attempt to solve this problem, the conventional container is provided with an openable and closable vent hole defined by the closure member which is opened when the container is to be opened. Such an arrangement, however, raises another problem in that the inconvenience arises of necessitating two operations in opening the closure, namely the operation of opening the vent hole and the operation of lifting up the closure member by the finger grip, thereby reducing the commercial value of the container.

Further, the vent hole of the conventional container is not closed if the closure member is merely fitted over the container body. Therefore, it is possible that the container is stored in a refrigerator with the vent hole left open, resulting in a problem in that the conventional container may lose its hermetic sealing effect.

SUMMARY OF THE INVENTION

The present invention is provided in order to solve the foregoing problems of the prior art.

Accordingly, it is an object of the present invention to provide a food preservative container that is capable of keeping food contained in the container in a very favorable condition from the viewpoint of food hygiene by cutting off air communication between the outside and the inside of the container.

Another object of the present invention is to provide a food preservative container that is constructed such that when the container 1 stored in a refrigerator is taken out of the refrigerator and is to be opened on a dining table, mere lifting of a closure member 3 with its finger grip portion 16 gripped with fingers causes a sealing portion 40 in a lower part of a outer cover portion 38 to be partially moved toward the center of the finger grip portion and detaches from the closure member 3 thereby releasing the hermetic pressure-contact with the closure member 3 even when the pressure of air 11 within the container is reduced and, hence, the operation of releasing the reduced pressure state inside the container and the operation of opening the closure by lifting up the closure member 3 can be achieved in a one-touch fashion.

Yet another object of the present invention is to provide a food preservative container such that when the container 1 containing food therein is to be stored in the refrigerator, the operation of merely fitting the closure member 3 over a container body before storing the container 1 in the refrigerator causes the outer cover portion 38 of the finger grip portion attached to the closure member 3 to return to its original position by its own elasticity, so that the lower part 40 of the circumferentially extending outer cover portion 38 is brought into hermetic pressure-contact with the upper surface of the closure member 3, thereby ensuring a hermetic seal effect, hence contributing to a reduction in the internal pressure of the container 1.

Still another object of the present invention is to provide a food preservative container such that when an unusual reduction in the internal pressure of the container stored in the refrigerator occurs, the lower part of the finger grip portion elastically moves to allow outside air to be introduced into the container thereby playing the role of a safety valve.

Still yet another object of the present invention is to provide a food preservative container such that when the finger grip portion 16 attached to the closure member 3 is to be washed, the finger grip portion 16, even if configured to cut off air communication in a usual state but to permit air communication when gripped with fingers, can be easily removed from the closure member 3 for washing by merely disengaging an engagement pawl 35 of an engagement portion 34.

Yet still another object of the present invention is to provide a hygienic finger grip portion 16 such that when the finger grip portion 16 is removed from the closure member 3 for washing, every part of a dent portion defined in an inside portion 24 of the outer cover portion 38 can be washed easily by raising the lower part of the outer cover portion 38 to make the inside of the outer cover portion 38 open to the outside.

A further object of the present invention is to provide a food preservative container such that when the internal pressure of the container 1 containing food therein is unusually elevated due to heating, a seal member 42 extending circumferentially around the closure member 3 is capable of serving as a safety valve.

Other objects and advantages of the present invention will readily become apparent from the following detailed description taken in connection with the accompanying drawings.

DETAILED DESCRIPTION OF THE PREFERRED EMBODIMENTS

Figure 1:
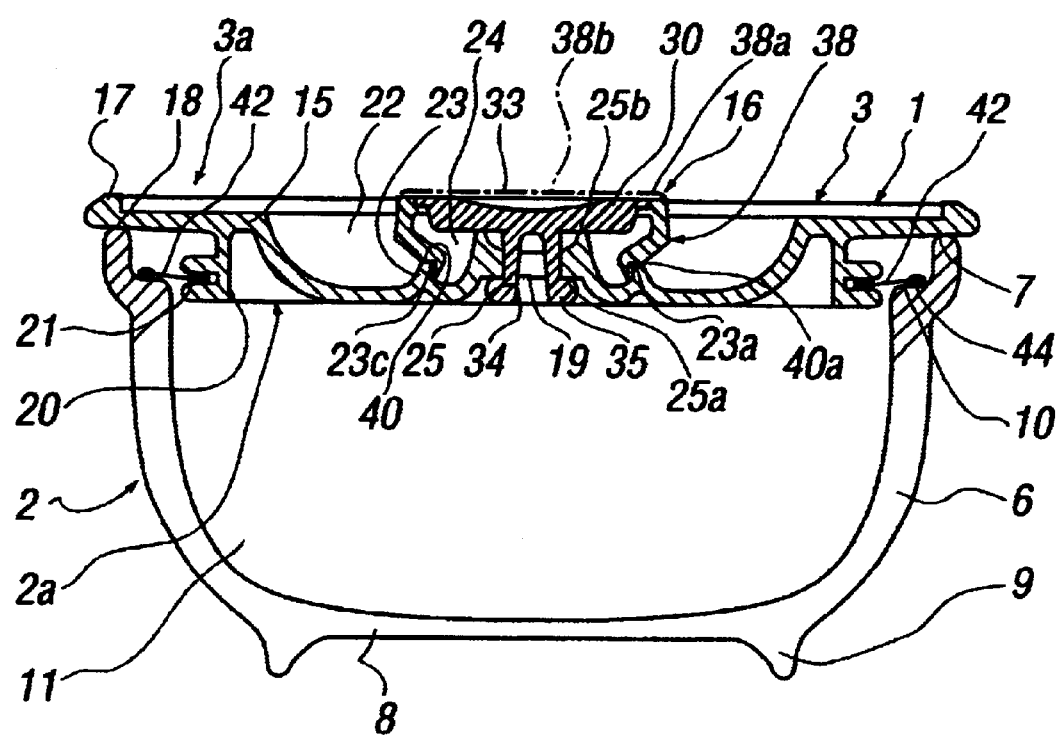
FIG. 1 is a longitudinal sectional view illustrating the relationship between a container body and a closure member.
Figure 2:
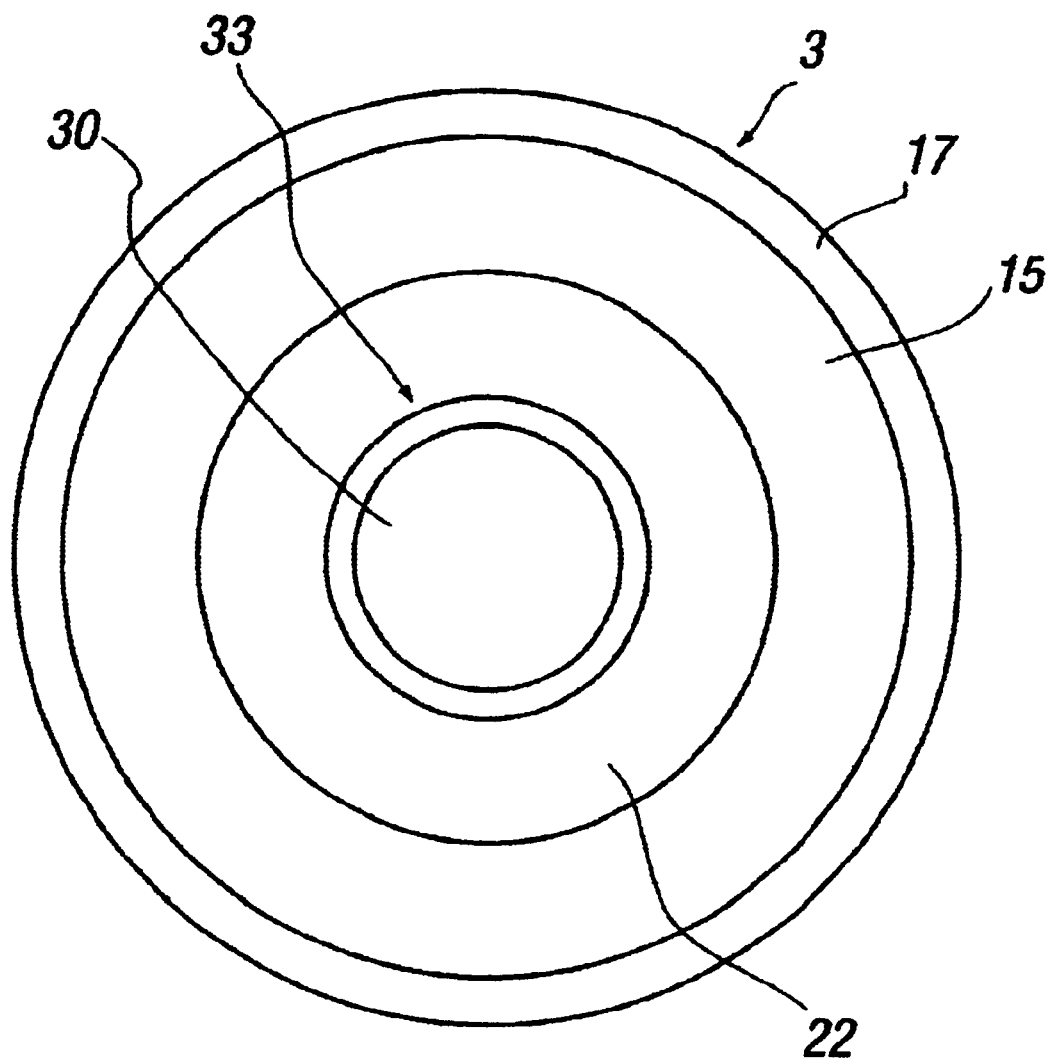
FIG. 2 is a plan view of the closure member.
Figure 3:
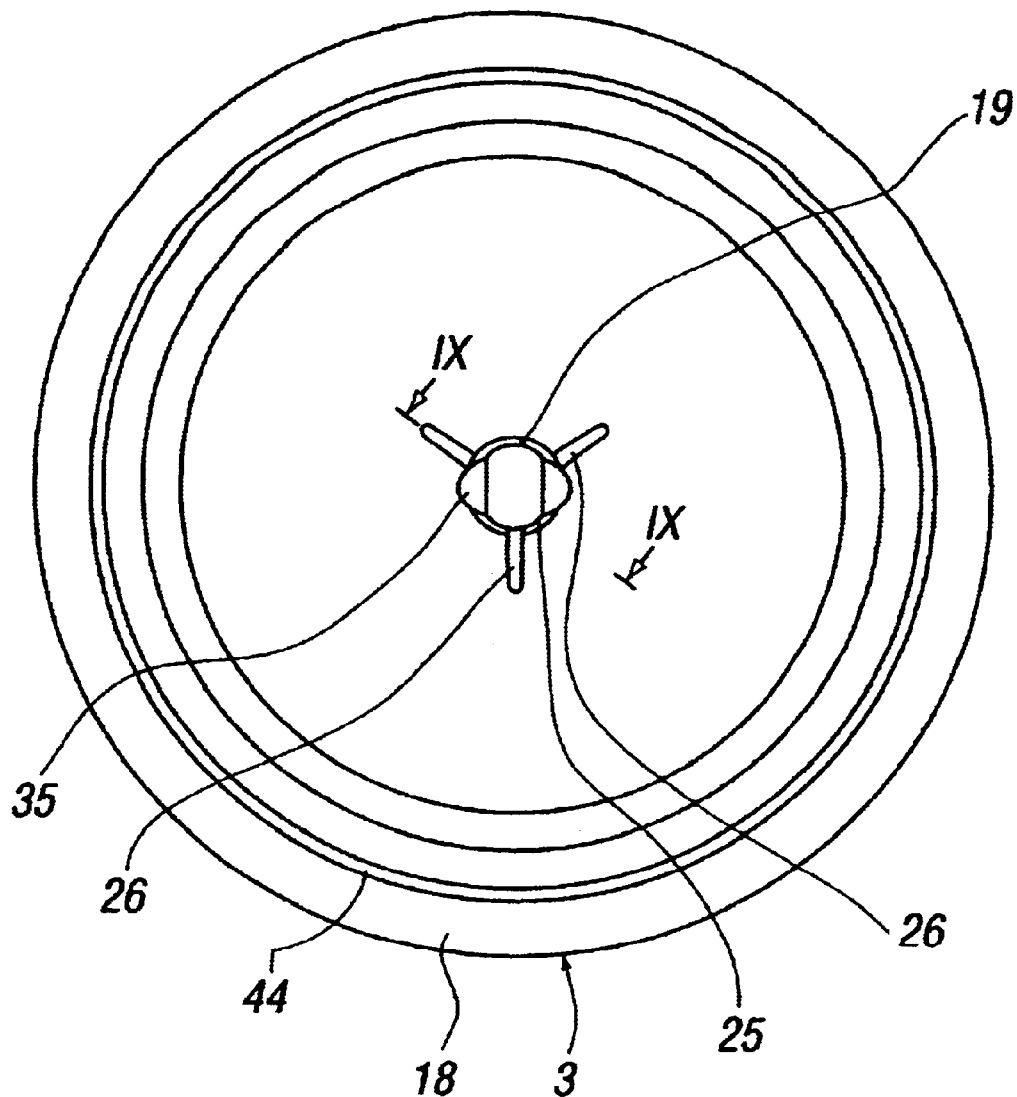
FIG. 3 is a back view of the closure member.

Hereinafter, embodiments of the present invention will be described with reference to FIG. 1 through FIG. 12.

Food preservative container 1 comprises a container body 2 and a closure member 3 attached with a finger grip portion, the closure member 3 being configured to fit over the container body 2 so as to close an opening 2a of the container body 2. The closure member 3 has a peripheral edge 3a capable of being hermetically fitted to the container body 2.

Like a well-known conventional container body, the container body 2 is of any desired construction comprising a peripheral wall 6, an upper edge 7, a bottom portion 8, a leg portion 9 and the like, all of which are formed using materials such as earthenware, porcelain, heat-resistant glass, metal, heat-resistant synthetic resin or the like selectively. The container body 2 defines a storage space 11 for storing food therein.

There are many known prior-art means for hermetically, removably and openably fitting the peripheral edge 3a of the closure member 3 to the upper edge 7 of the container body 2. Therefore, the food preservative container 1 of the present invention may utilize any desired one of such prior-art fitting means.

FIG. 1 shows a characteristic construction of such fitting means. Reference numeral 10 designates a step portion formed on an inner peripheral portion of the container body 2 to circumferentially extend adjacent to the upper edge 7, the step portion 10 forming a flat sealing surface providing a hermetic seal when abutted by a free edge 44 of a seal member 42.

As is well known in the art, a closure body 15 of the closure member 3 is formed using materials such as earthenware, porcelain, heat-resistant glass, metal, heat-resistant synthetic resin or the like selectively. The closure body 15 has a peripheral edge 17 circumscribed with an upwardly bulged reinforcement member. Reference numeral 18 designates an abutment portion adapted to abut the upper edge 7. Reference numeral 20 designates a holding member for holding the seal member (packing 42), the holding member 20 defines a holding groove 21 for holding a base portion 43 of the seal member 42.

Figure 9:
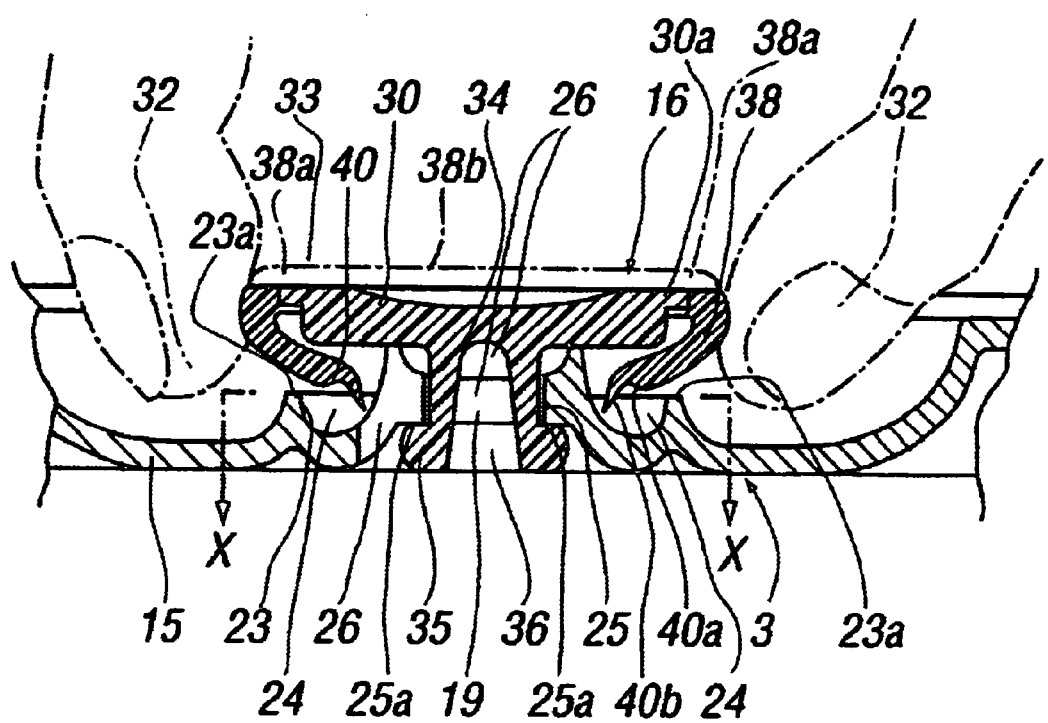
FIG. 9 is a fragmentary longitudinal sectional view illustrating a state where the grip outer cover portion is moved toward a central portion when the closure member is lifted up with the finger grip portion gripped with fingers.

Reference numeral 22 designates an annular dent portion defined circumferentially around the finger grip portion 16 for receiving fingertips in the case where an upper surface of the finger grip portion 16 is lowered so as to be aligned flush with an upper surface of the closure member 3. This dent portion 22 would be unnecessary if the upper surface of the finger grip portion 16 was located higher than the upper surface of the closure member 3. Reference numeral 23 designates a sealing wall having a surface brought into hermetic pressure-contact with a lower part 40 of a grip outer cover portion 38. The sealing wall 23 is in the form of an annular wall slightly protruding from the upper surface of the closure member 3 so as to match the outer peripheral shape of the lower part 40. The sealing wall 23 has an annular top surface 23a that is a horizontal surface or an inclined surface having an outer peripheral edge higher than an inner peripheral edge for elastic pressure-contact with a lower surface of an annular step portion 40a forming the lower part of the outer cover portion 38, thereby ensuring a sealing effect. Reference numeral 25 designates a hole border circumscribing a through-hole 19 defined centrally at the closure member 3. A lower portion of the hole border 25 is formed into a step portion 25a allowing an engagement pawl 35 to be engaged therewith as shown in FIG. 9, while an upper portion 25b is configured to support a head member 30 of the finger grip main body 33. Around the hole border 25 is defined a reduced-pressure space 24 which constantly communicates with the storage space 11 and of which the internal pressure is reduced when the container 1 is stored in a refrigerator in the same way as the internal pressure of the storage space 11. This reduced-pressure space 24 also serves as a space allowing the sealing portion 40 forming the lower part of the grip outer cover 38 portion to retract, as clearly shown in FIG. 9. Reference numeral 26 designates vent holes extending radially outwardly from the through-hole 19 for allowing reliable communication between the storage space 11 and the reduced-pressure space 24. Though air communication is sufficiently ensured by the provision of the through-hole 19 only, it is possible to provide a vent hole independently of the through-hole 19, or the foregoing vent holes 26 for more sure communication between the inside and the outside of the closure member 3.

The finger grip portion 16 is attached to the closure member 3 by any known means, for example, by bonding the finger grip portion 16 as an integral part or comprising separate parts to the closure member 3 with any bonding means or fitting a disengageably engageable part into the through-hole 19 of the closure member 3 as shown in the drawings.

The finger grip main body 33 of the finger grip portion 16 has a lower portion formed with a convex engagement portion 34. The engagement portion 34 comprises, for example, a plurality of engagement members 34a (bifurcated or trifurcated member) defining a retractable space 36 therebetween and protruding downwardly from the lower portion of the finger grip main body 33. Each of the engagement members 34a has a lower portion formed with the engagement pawl 35 disengageably engaging a lower edge 25a of the through-hole 19 of the closure member 3. The engagement members 34a that can elastically open up or narrow the space therebetween are located in the through-hole 19 if they are inserted through the through-hole 19 so that the engagement pawls 35 at their free ends engage the step portion 25a, while air communication through the retractable space 36 or the vent holes 26 is ensured. Thus, the finger grip main body 33 is removably attached to the closure member 3.

The finger grip main body 33 is formed by integrating the disk-like head member 30 and the engagement portion 34 bifurcated (defining a space 36 therebetween) to impart the two engagement pawls 35 with the ability to elastically open up or narrow the space therebetween with use of a rigid material such as ABS or polypropylene.

It should be noted that FIG. 13 through FIG. 18 show other characteristic arrangements of means for attaching the finger grip portion 16 to the closure member 3.

The finger grip main body 33 is circumscribed with the grip outer cover portion 38 formed from a flexible airtight material (an elastic material having a restoring force such as silicone rubber or a heat-resistant synthetic resin partially having a predetermined elasticity). The outer cover portion 38 is wholly shaped cylindrically and has an upper part formed with an annular joint portion 39 that is hermetically and securely joined with a fitting step portion (joint portion) 37 formed circumferentially around the head member 30 by any desired means, for example, an adhesive or thermal fusion bonding. However, in the case where the finger grip main body 33 is formed from a material having such rigidity as to maintain its original shape in a normal condition, the outer cover portion 38 can be imparted with elasticity if it is made thinner and, as a result, it is possible to mold the finger grip main body 33 and the outer cover portion 38 integrally simultaneously using the same material.

The structure for joining the annular joint portion 39 of the upper part of the outer cover portion 38 with a peripheral portion 30a of the head member 30 may be a joint structure wherein the peripheral portion 30a of the head member 30 is sandwiched between a partially turned-up annular member 38a indicated by a two-dot chain line which protrudes inwardly from the top of the outer cover portion 38 and a protruding member 39a formed below and spaced from the member 38a, these members 38a and 39a elastically, removably and hermetically sandwiching the portion 30a.

It is also possible that entire scope 38b, indicated by a two-dot chain line, of the upper part of the outer cover portion 38 is formed into a hat-like shape integral with the outer cover main body 38 using the same material so as to be elastically, hermetically and removably fitted over the finger grip main body 33 in a manner to completely cover the upper portion of the head member 30 and its peripheral portion 30a.

In either case it is possible to detach the upper part of the outer cover portion 38 from the upper portion of the head member 30 by turning up the upper part, separate the outer cover portion 38 from the upper portion of the head member 30 for washing, and elastically and hermetically fit the outer cover portion 38 over the upper portion of the head member 30 again after washing.

As shown in FIG. 1, the lower part 40 of the outer cover portion 38 is formed with the annular step portion 40a circumferentially thereof for easy hermetic contact with the closure member 3. The annular step portion 40a is brought into hermetic pressure-contact with the upper surface (sealing surface) 23a of the sealing wall 23. Besides this sealing portion, a thin lower peripheral edge portion 40b that is additionally or optionally formed is brought into hermetic pressure-contact with a sealing surface 23c formed on an inner surface of the annular wall of the closure member 3 as shown in FIG. 1.

The thickness of the lower part 40 may be increased or decreased to meet demands of users related to the flexibility of the material of the outer cover portion 38, the difference in atmospheric pressure between the reduced-pressure space 24 and the outside, or the like. If the lower part 40 is rigidly formed, it can withstand a larger difference in atmospheric pressure. If the lower part 40 is made flexible, it serves as a safety valve that opens when the difference in atmospheric pressure becomes large. In the case where the desired atmospheric pressure difference is small, it is possible to employ an arrangement such that the upper surface of the closure member 3 is made flat and a lowermost edge of the lower part 40 is brought into pressure-contact with the upper surface of the closure member 3 in a usual condition to provide a sealing effect.

Figure 4:
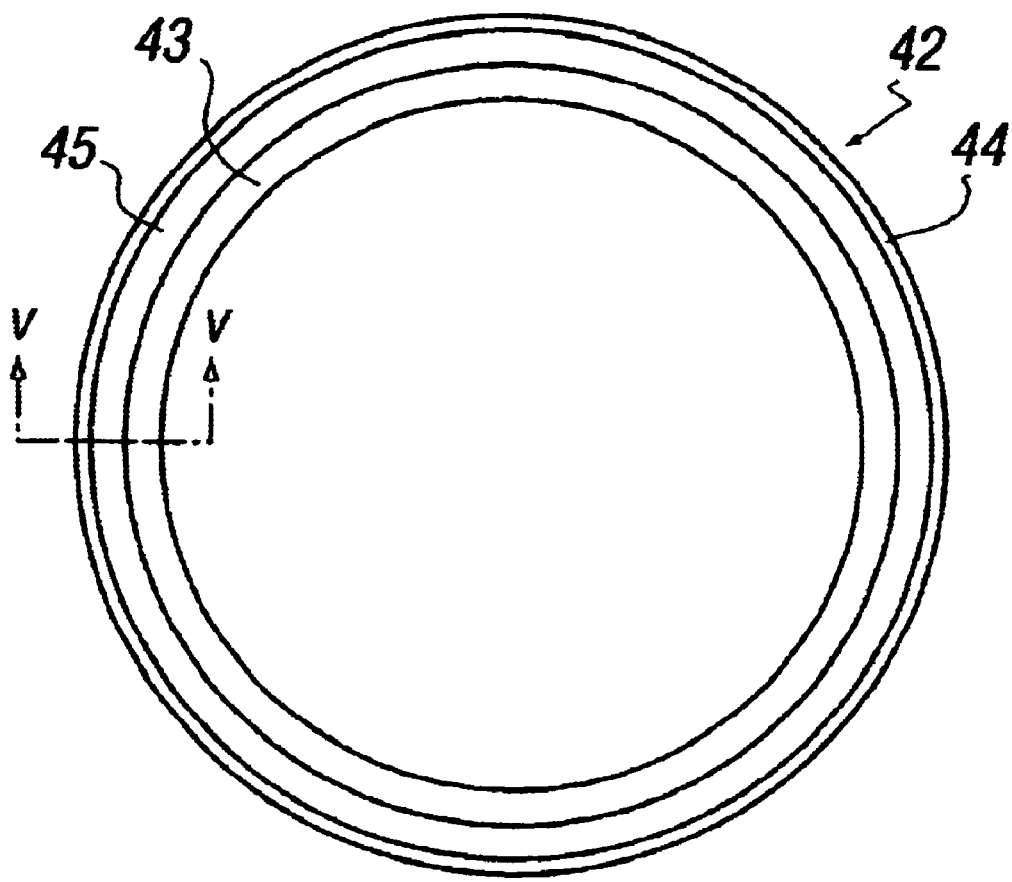
FIG. 4 is a plan view showing a seal member.
Figure 5:
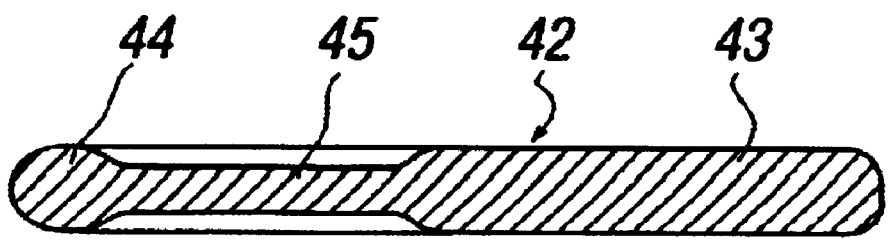
FIG. 5 is a sectional view along the line V—V in FIG. 4.
Figure 6A:
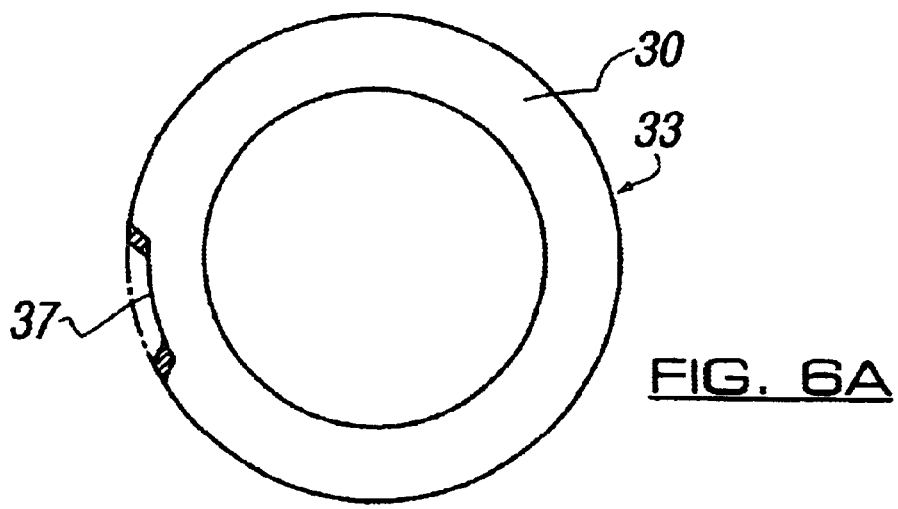
FIG. 6(A) is a partially cutaway plan view showing a finger grip main body.
Figure 6B:
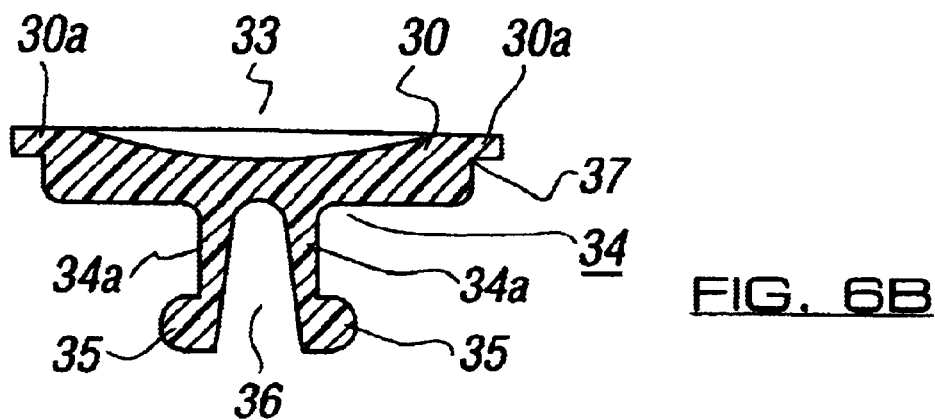
FIG. 6(B) is a longitudinal sectional view along the line VI—VI.
Figure 6C:
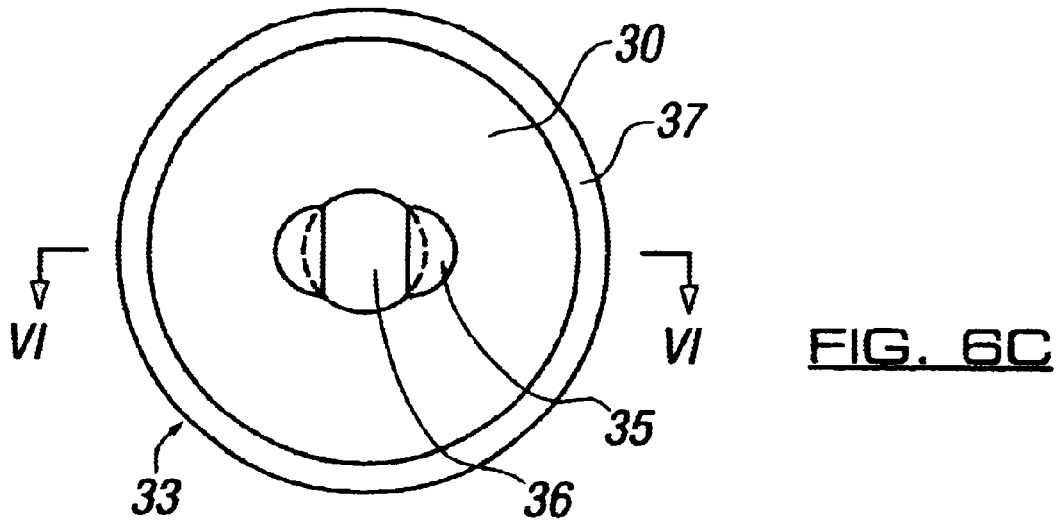
FIG. 6(C) is a back view of the finger grip main body.
Figure 7A:
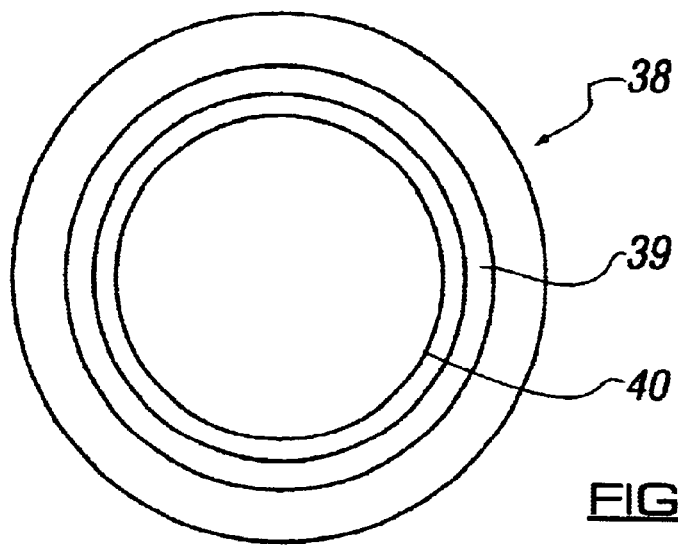
FIG. 7(A) is a plan view showing a grip outer cover portion.
Figure 7B:
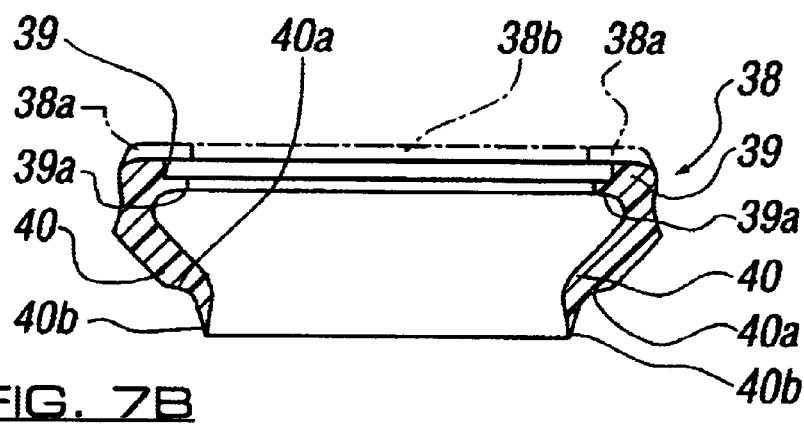
FIG. 7(B) is a longitudinal sectional view of the grip outer cover portion.
Figure 7C:
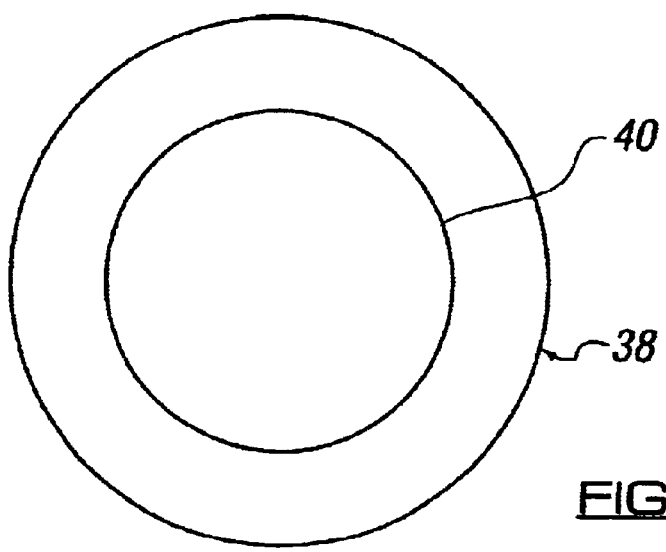
FIG. 7(C) is a back view of the grip outer cover portion.
Figure 8A:
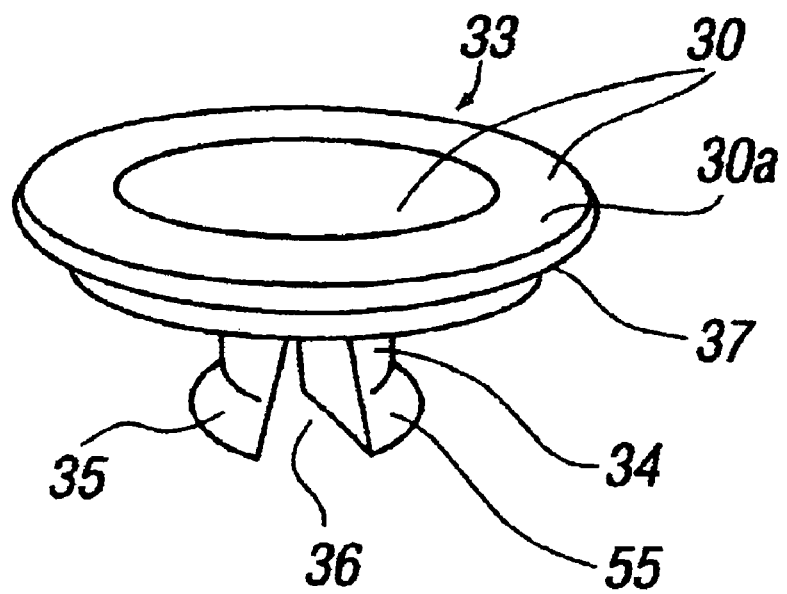
FIG. 8 is a perspective view showing the finger grip main body and the grip outer cover portion.
Figure 8B:

The seal member 42 shown in FIG. 4 and FIG. 5 is formed into an annular shape having a hollow central portion using an elastic material having a restoring force such as silicone rubber or a heat-resistant synthetic resin having a predetermined elasticity. The seal member 42 has an inner peripheral portion forming a base portion 43 hermetically fitted into a holding groove 21 of the holding member 20 and an outer peripheral portion forming a slightly thicker free edge 44 brought into hermetic pressure-contact with a slightly upwardly inclined flat surface 10 of the step portion 10. An intermediate portion 45 of the seal member 42 is made thinner so that the seal member 42 is imparted with a sufficient elasticity as a whole. The elasticity of the seal member 42 is such as to allow the free edge 44 to pressure-contact the step portion 10 but not to raise the closure member when the closure member is in a state fitted over the container body. If the air within the container 1 under heating is unusually expanded, the seal member 42 is lifted up to serve as a safety valve.

Food is put into the food preservative container 1 of the construction described above and the container 1 in the state shown in FIG. 1 is usually stored in a refrigerator. The internal pressure of the container 1 is reduced as the temperature in the container 1 lowers in the refrigerator. Since the peripheral edge of the seal member 42 hermetically pressure-contacts the sealing portion 10 while, at the same time, the sealing portion 40 in the lower part of the outer cover portion 38 hermetically contacts the upper surface of the closure member 3, there is no communication with outside air and, hence, odors within the container 1 are prevented from transferring to other food stored in the refrigerator.

Figure 10:
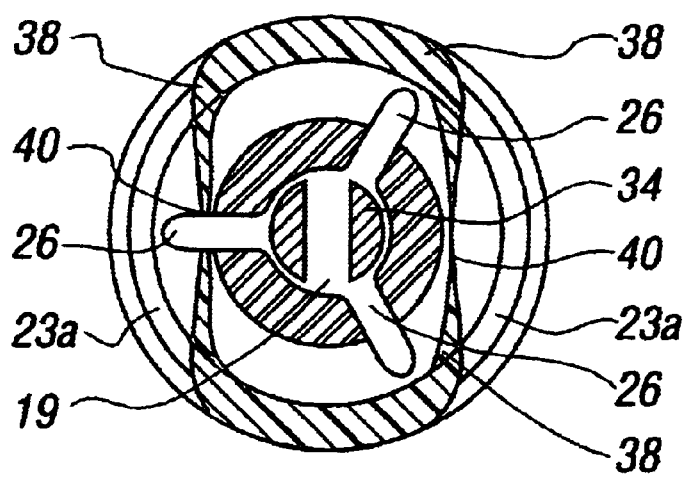
FIG. 10 is a sectional view along the line X—X in FIG. 9.
Figure 11:
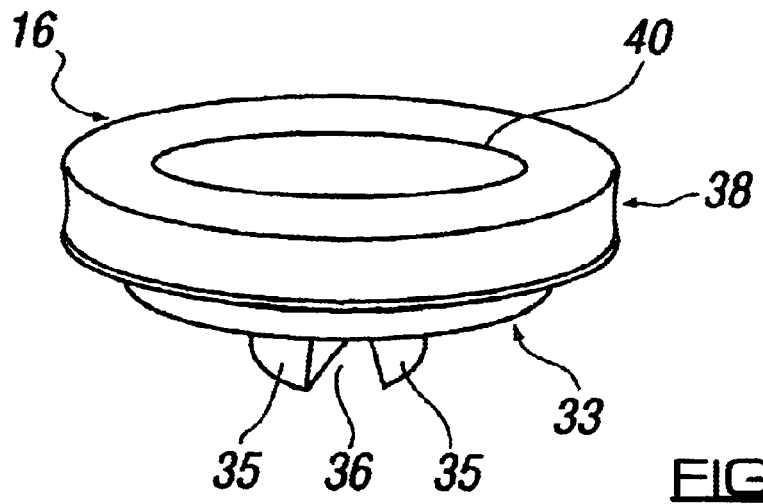
FIG. 11 is a perspective view showing a state where the finger grip main body and the grip outer cover portion are assembled together (a state where a lower part 40 of the grip outer cover portion is turned up to extend above the finger grip main body)

When a container is taken out of the refrigerator, the container cannot be opened easily even if the user tries to lift up the closure member 3 because the internal pressure of the container is reduced. As apparent from the foregoing description, the food preservative container of the present invention allows its closure member 3 to be easily lifted up because when the outer cover portion 38 of the finger grip portion, which is formed from the aforementioned flexible material, is gripped with fingers in order to lift up the closure member 3, the lower part 40 of the outer cover portion 38 of the finger grip portion 16 is partially moved toward the center as shown in FIG. 9 and FIG. 10 and hence slightly detaches from the upper surface of the closure member 3 to release the hermetic pressure-contact with the closure member 3, thereby allowing air communication between the internal space 11 of the container 1 and the outside through the through-hole 19 or the vent holes 26.

When the finger grip portion 16 is to be washed, the finger grip portion 16 is detached from the closure member 3 if the closure member 3 is removed from the container body 2 in the state shown in FIG. 1 and the engagement pawls 35 are gripped with fingers and moved toward the central portion and then drawn out of the through-hole 19 upwardly. The finger grip portion 16 thus detached from the closure member 3 is very easy to wash. Further, when the lower part 40 of the grip outer cover portion 38 circumscribing the finger grip main body 33 is turned up about the upper part 37, a portion around the engagement portion 34 of the finger grip main body 33 can be easily washed to keep an hygienically favorable state.

Fitting of the finger grip portion 16 to the closure can be achieved by inserting the engagement portion 34 into the through-hole 19 as shown in FIG. 1. The annular seal member 42 can also become ready for washing if the inner peripheral portion thereof is drawn out of the holding groove 21 that allows fitting and removal of the seal member 42. The fitting state of the seal member 42 can be restored easily.

FIG. 13 through FIG. 18 illustrate embodiments of closure member 3, finger grip main body 33 attached to the closure member 3 and grip outer cover portion 38 circumscribing the finger grip main body 33, each having a partially different feature from the corresponding one shown in FIG. 1 through FIG. 12.

The following description is made with reference to FIG. 13 through FIG. 18. A closure member 3d is partially shown only to illustrate the different feature, while many other parts of the closure member 3 having been described with reference to FIG. 1 are omitted together with the illustration of the container.

Figure 14A:
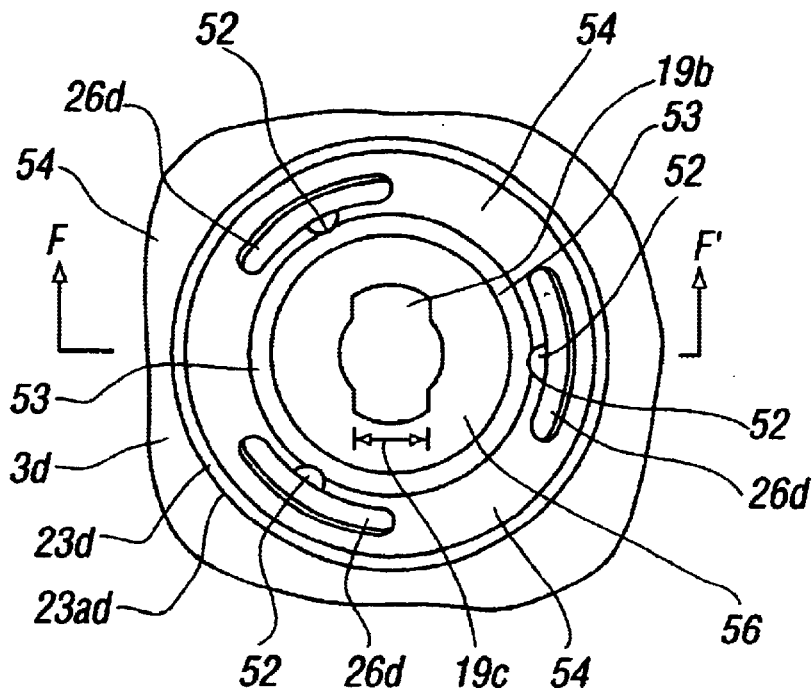
FIG. 14(A) is a plan view showing a part of the closure member from which the finger grip portion is removed.
Figure 14B:
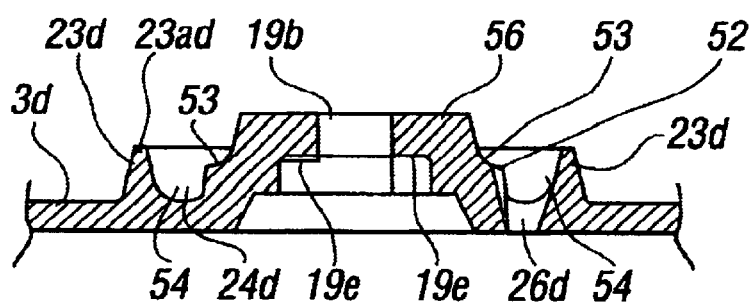
FIG. 14(B) is a sectional view along the line F–F' in FIG. 14(A)

The closure member 3d has a central portion defining a through-hole 19b that is not circular, for example rectangular, in a plan view as shown in FIG. 14(A), and a slightly raised portion 56 around the through-hole 19b as shown in FIG. 14(B).

Figure 14C:
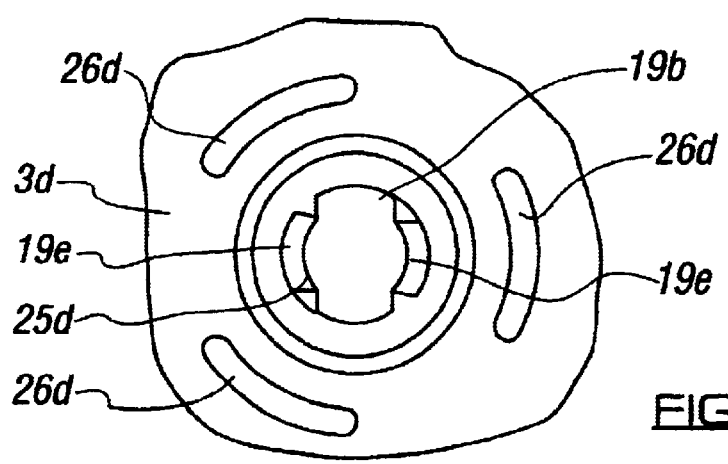
FIG. 14(C) is a back view of the part of the closure member shown in FIG. 14(A)
Figure 15A:
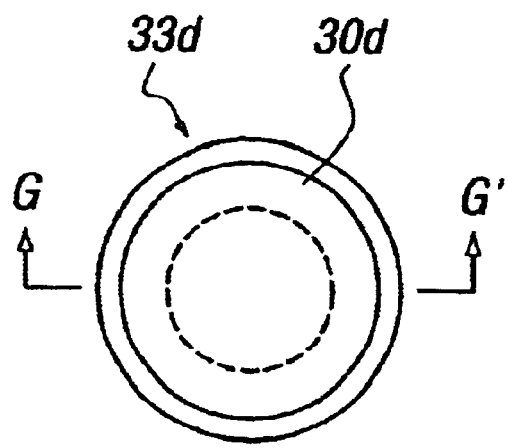
FIG. 15(A) is a plan view of the finger grip main body.
Figure 15B:
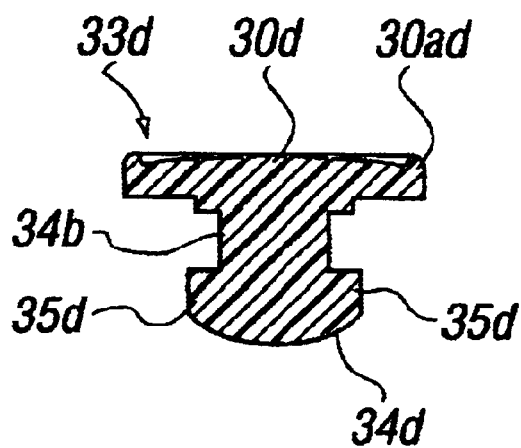
FIG. 15(B) is a sectional view along the line G–G' in FIG. 15(A)
Figure 15C:
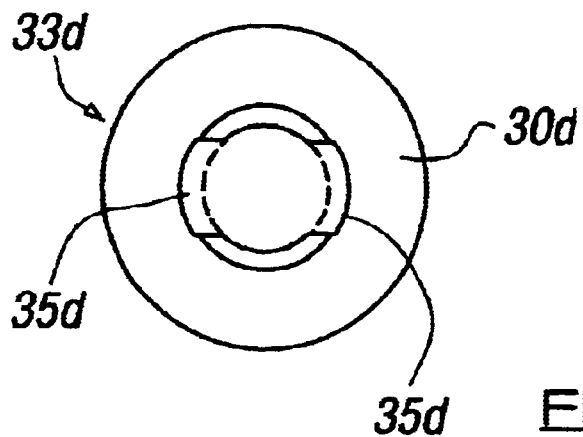
FIG. 15(C) is a back view of the finger grip main body shown in FIG. 15(A)
Figure 16A:
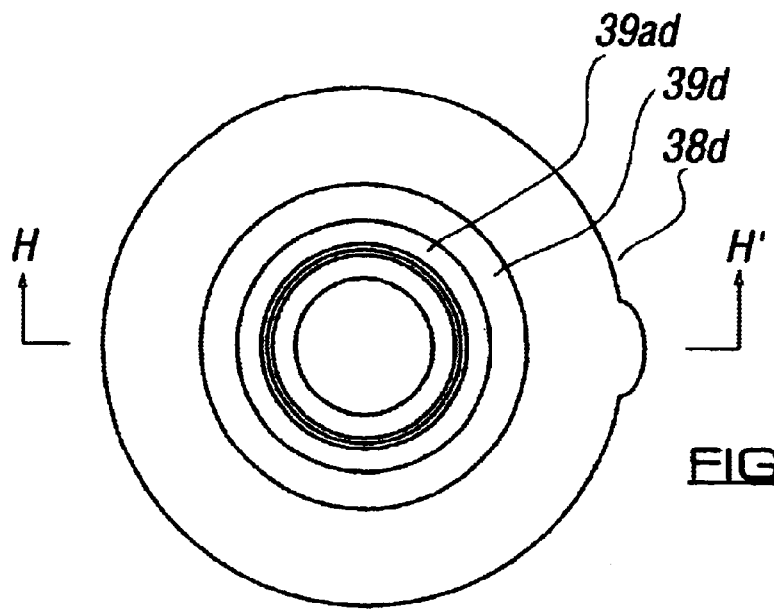
FIG. 16(A) is a plan view of the grip outer cover portion.
Figure 16B:
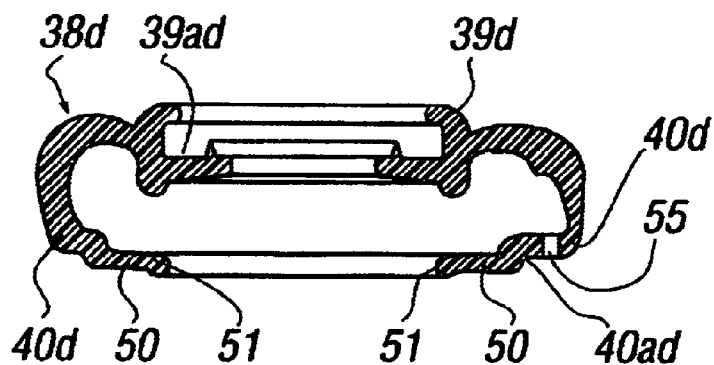
FIG. 16(B) is a sectional view along the line H–H' in FIG. 16(A)
Figure 16C:
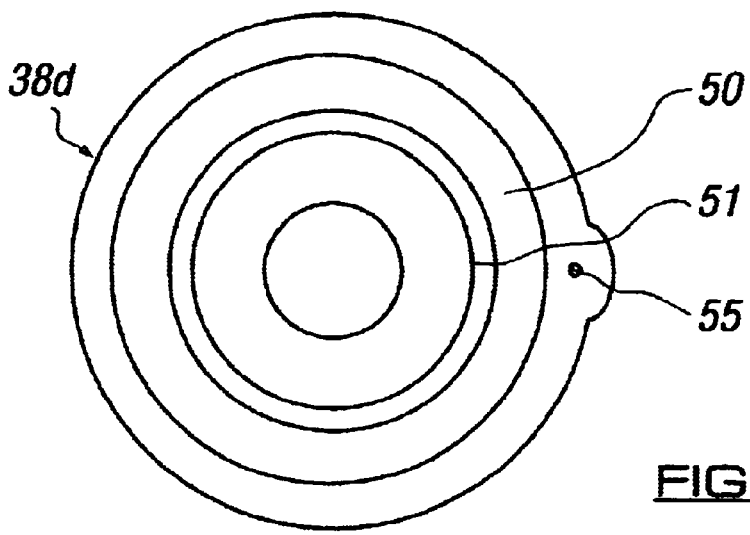
FIG. 16(C) is a back view of the grip outer cover portion shown in FIG. 16(A)
Figure 17A:
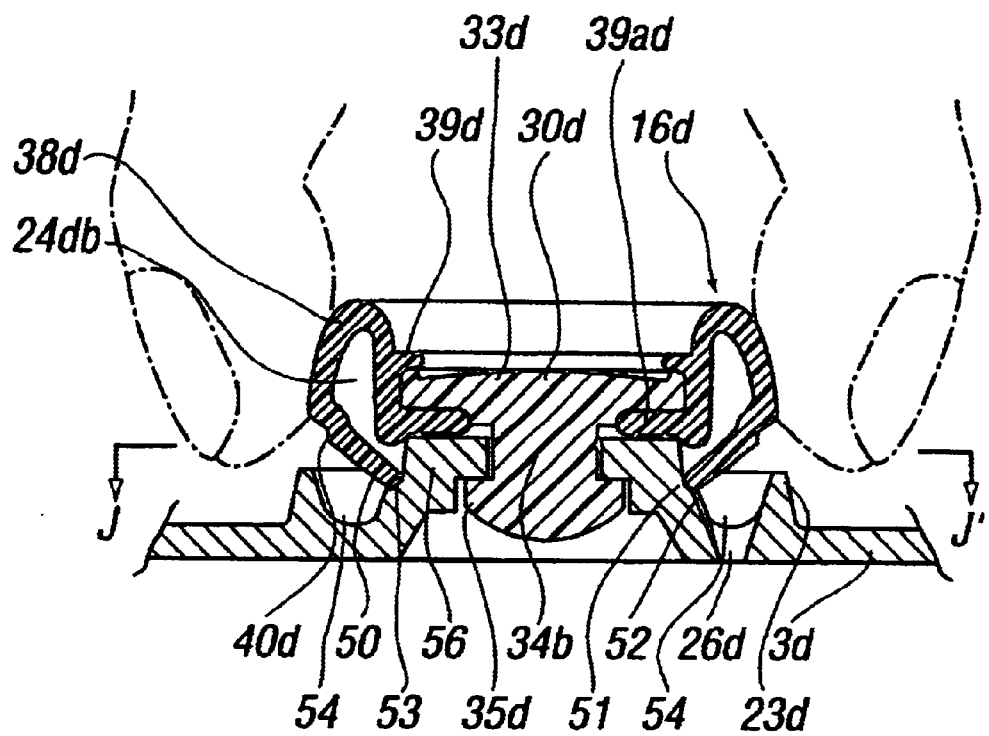
FIG. 17(A) is a sectional view, along the line K–K', illustrating a state where the grip outer cover portion is moved toward a central portion when the closure member is lifted up with the finger grip portion gripped with fingers.
Figure 17B:
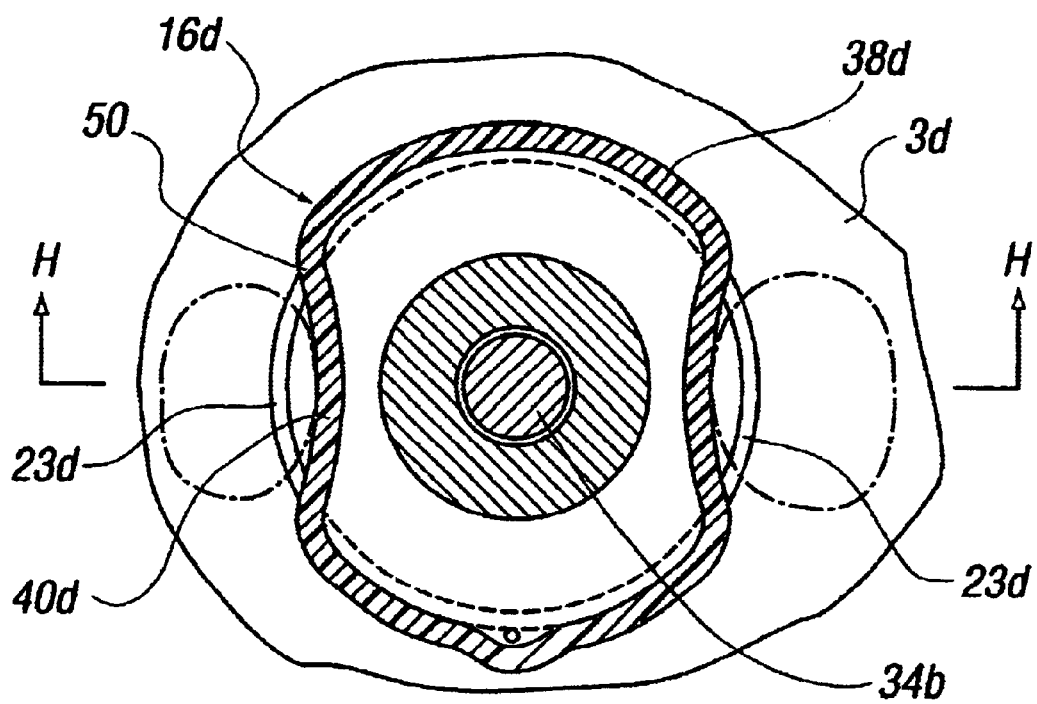
FIG. 17(B) is a sectional view along the line J–J' in FIG. 17(A)

On an upper side of the closure member 3d and about a finger grip main body 33d are formed an abutment surface 53, an introduction groove 54 and a sealing wall 23d, which circumscribe the finger grip main body 33d sequentially. At an innermost location an annular step portion 53 forming the abutment surface 53 is formed continuously with the outer periphery of the slightly raised convex portion 56 to receive an inner free edge 51 of an annular valve member 50. A trench-like introduction groove 54 is formed next to and continuously with the step portion 53 circumferentially of the step portion 53 as shown in FIG. 14. Further, around the outer periphery of the introduction groove 54 is formed an upright sealing wall 23d continuously with and circumferentially around the introduction groove 54 for defining the introduction groove 54. The sealing wall 23d relatively defines the introduction groove 54 and hence may be flush with the upper surface of the closure member 3d to define the introduction groove 54 having a greater depth.

The introduction groove 54 defines a vent hole 26d at a single or plural points for providing communication with the inside of the closure member in order for the internal atmospheric pressure of the introduction groove 54 to become equal to the internal atmospheric pressure of the container body 2.

Figure 18:
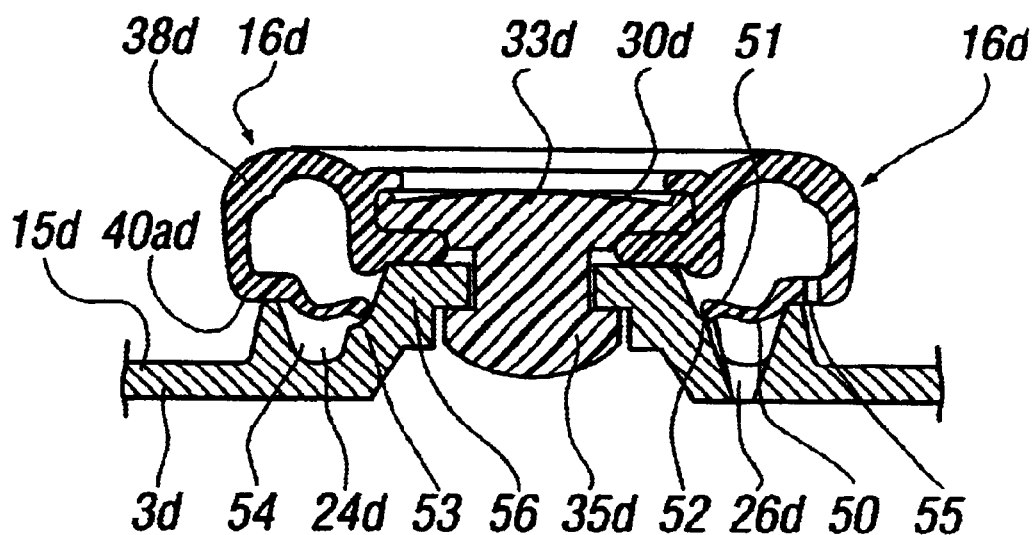
FIG. 18 is a sectional view, along the line K–K' in FIG. 17(B), illustrating a state where a negative pressure is provided in an introduction groove to cause an annular valve member to bend downwardly thereby allowing air to be supplied from the inside of the grip outer cover portion into the container body through the introduction groove.

An upper portion 52 of the introduction groove 54 on the central side defines an air communication hole 52 at a single or plural points which allows air communication through between a free edge 51 of an annular valve member 50 and the central side of the introduction groove 54 when the free edge 51 of the valve member 50 pressure-contacting the abutment surface 53 is bent and moved toward the bottom of the introduction groove 54 due to a reduction in the internal pressure of the introduction groove 54 (see FIG. 18).

Figure 13A:
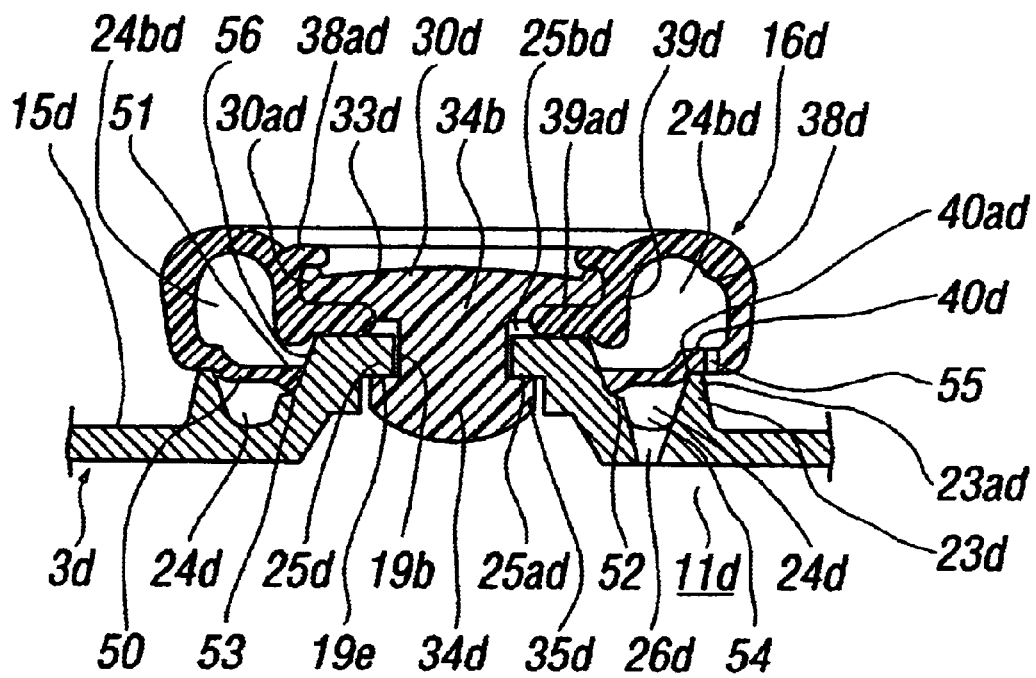
FIG. 13(A) is a sectional view, along the line E–E', illustrating the relationship between a part of the closure member and the finger grip portion.
Figure 13B:
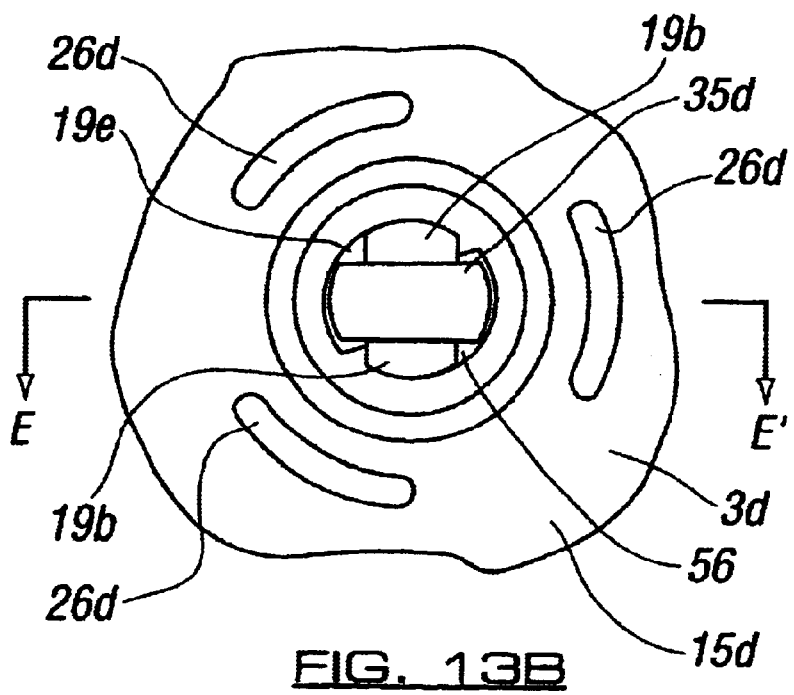
FIG. 13(B) is a back view showing a part of the closure member and the finger grip portion.

A convex engagement portion 34d formed in a lower portion of the finger grip main body 33d of the finger grip portion 16d is described below. This engagement portion 34d is different from the corresponding one shown in FIG. 1. The engagement portion 34d comprises a protruding member 34b formed of the same material as a head portion 30d of the finger grip main body and protruding downwardly from the lower side of the head portion 30d, and an engagement pawl 35d which is shaped corresponding to the through-hole 19b shaped non-circular in the plan view and defined in the closure member 3d and is sized slightly smaller than the through-hole 19b for insertion into and withdrawal from the through-hole 19b. The engagement pawl 35d has a free end configured to disengageably engage a lower edge 19e of a side of a smaller-diameter 19c of the through-hole 19b as shown in FIG. 13(A) by rotating the free end. The engagement pawl 35d is shaped non-circular, for example, rectangular in the back view.

Grip outer cover portion 38d is formed from a flexible and airtight material as is the grip outer cover portion shown in FIG. 1.

Figure 12:
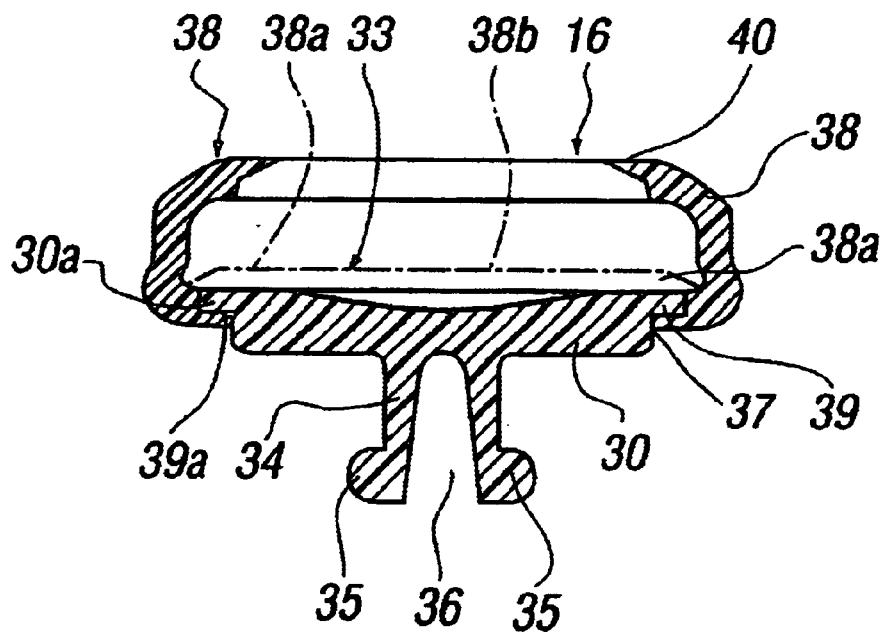
FIG. 12 is a longitudinal sectional view of the assembled state of the finger grip main body and the grip outer cover portion shown in FIG. 11.

An upper part 39d of the outer cover portion 38d is joined with the finger grip main body 33d as shown in the drawings. An annular inner member 39ad at the upper part of the outer cover portion 38d is joined with the underside of a peripheral portion 30ad of the head member. In a fitting state shown in FIG. 13(A) the annular inner member 39ad is compressed between the upper and lower members, so that communication between outside air and a reduced-pressure space 24bd is cut off. A lower part 40d of the outer cover portion 38d is capable of being turned up about an upper portion 39d as shown in FIG. 12.

The lower part 40d of the outer cover portion 38d annularly extends so as to hermetically pressure-contact an upper portion of the upright sealing wall 23d of the closure member 3d. In this state the reduced-pressure space 24bd is hermetically cut off against outside air as shown in FIG. 1.

The annular valve member 50 formed from the same material as the lower part 40d of the outer cover portion 38d extends from the inner side of the lower part 40d toward the annular abutment surface 53 over the trench-like introduction groove 54 as shown in FIG. 13(A).

The free edge 51 of the valve member 50 hermetically pressure-contacts the annular abutment surface 53 to cut off air communication between a second reduced-pressure space 24bd defined inside the outer cover portion 38d and a reduced-pressure space 24d defined under the annular valve member 50 on the container body side.

The outer cover portion 38d is formed from a flexible and elastic material so that when the outer cover portion 38d is gripped with fingers to lift up the closure member 3d (see FIG. 17), the lower part 40d of the outer cover portion 38d is partially moved toward the center and hence detaches from the sealing wall 23d of the closure member 3d to release the hermetic state of the reduced-pressure space 24d against outside air thereby allowing air communication between an internal space 11d of the container 1 and the outside through a vent hole 26d.

FIG. 18 shows an embodiment of outer cover portion 38d having an outer periphery defining an optional air introduction hole 55. This embodiment is constructed so that the second reduced-pressure space 24bd is allowed to previously communicate with outside air in the state shown in FIG. 13(A). The provision of the air introduction hole 55 enables the container to exhibit a special function. When the container body 2 fitted with the closure member 3 is stored in a refrigerator, the finger grip portion 16d initially assumes the state shown in FIG. 13(A). As the inside of the container is cooled to reduce the internal pressure of the container, a negative pressure is provided in the reduced-pressure space 24d and, hence, the annular valve member 50 strongly contacts the sealing wall 23d and the abutment surface 35 thereby cutting off air communication therethrough and closing the upper portion of the air communication hole 52.

As the negative pressure in the reduced-pressure space 24d further grows, the entire container receives increasing pressure on its periphery. Under such a condition, the annular valve member 50 having elasticity, if previously formed slightly thinner, is drawn downwardly as shown in FIG. 18 and hence elastically bent and slightly moved laterally to open the upper portion of one air communication hole 52 thereby permitting outside air to naturally flow thereinto from the second reduced-pressure space 24bd. By adjusting the reduced-pressure condition of the inside of the container in this way, it is possible to prevent the container from being crushed or partially damaged by external pressure. When the internal pressure of the container comes close to the atmospheric pressure again, the annular valve member 50 having a restoring force restores its state shown in FIG. 13 and keeps its hermetic sealing state.

It should be noted that parts shown in FIG. 13 through FIG. 18 that are considered identical with or equivalent to corresponding parts shown in FIG. 1 through FIG. 12 in function, property, feature or the like are designated by like reference characters added with "d" for the purpose of avoiding repetition of description.

As many apparently widely different embodiments of this invention may be made without departing from the spirit and scope thereof, it is to be understood that the invention is not limited to the specific embodiments thereof except as defined in the appended claims.

What is claimed is:

1. A food preservative container (1) comprising a container body (2), and a closure member (3) fitted over the container body (2) so as to close an opening (2a) of the container body (2), the closure member (3) having an upper portion fitted with a finger grip portion (16), and a peripheral edge (3a) capable of being hermetically and removably fitted to the container body (2), wherein:

the finger grip portion (16) fitted to the closure member (3) comprises a finger grip main body (33) attached to the closure member (3), a grip outer cover portion (38) circumscribing the finger grip main body (33) and having an upper part joined with the finger grip main body (33) and a lower part annularly extending so as to hermetically contact the closure member (3), and a vent hole (26) defined in an inside region of the closure member (3) circumscribed by the grip outer cover portion (38) for allowing communication between the inside and outside of the closure member (3); and the grip outer cover portion (38) of the finger grip portion (16) is formed from a flexible and elastic material such that when the grip outer cover portion (38) is gripped with fingers in order to lift up the closure member (3), the lower part (40) of the grip outer cover portion (38) is partially moved toward a center of the finger grip portion (16) and detaches from the closure member (3) to release a hermetic state of the closure member (3) against outside air thereby allowing an internal space (11) of the container to communicate with the outside through the vent hole (26).

2. The food preservative container according to claim 1 wherein the finger grip portion (16) fitted to the closure member (3) is constructed such that the finger grip main body (33) of the finger grip portion (16) has a lower portion formed with a convex engagement portion (34) which is inserted into a through-hole (19) defined by the closure member (3) to disengageably engage in the through-hole (19) thereby removably fitting the finger grip main body (33) to the closure member (3).

3. The food preservative container according to claim 2 wherein the convex engagement portion (34) formed at the lower portion of the finger grip main body (33) of the finger grip portion comprises a plurality of engagement members (34a) defining a retractable space (36) therebetween and protruding downwardly from a lower portion of a head member (30) of the finger grip main body, the engagement members (34a) each having a lower portion formed with an engagement pawl (35) disengageably engaging a lower edge of the through-hole (19) of the closure member (3).

4. The food preservative container according to claim 2 wherein the convex engagement portion (34) formed at the lower portion of the finger grip main body (33) of the finger grip portion comprises a member (34b) protruding downwardly from a lower portion of a head member (30) of the finger grip main body, and an engagement pawl (35d) of non-circular shape and configured to disengageably engage a lower edge of a smaller-diameter side of the through-hole (19b) which is non-circular and defined by the closure member (3).

5. The food preservative container according to claim 1, wherein: the finger grip portion (16) fitted to the closure member (3) is constructed such that the finger grip main body (33) of the finger grip portion (16) has a lower portion formed with a convex engagement portion (34) which is inserted into a through-hole (19) defined by the closure (3) to disengageably engage the through-hole (19) thereby fitting the finger grip main body (33) to the closure member (3); and the closure member (3) is formed on an upper surface thereof with an upright sealing wall (23) extending circumferentially around the through-hole (19), and the upper part of the grip outer cover portion (38) is joined with the finger grip main body (33), while the lower part of the grip outer cover portion (38) extends annularly such that an outer surface of the grip outer cover portion (38) hermetically contacts an inner periphery of the sealing wall (23) formed on the upper surface of the closure member (3).

6. The food preservative container according to claim 1 wherein the lower part of the grip outer cover portion (38) circumscribing the finger grip main body (33) is formed from an elastic material which allows the lower part to be turned up about the upper part of the grip outer cover portion (38) to extend above the finger grip main body (33).

* * * * *